US012597245B2

(12) United States Patent
Sato

(10) Patent No.: US 12,597,245 B2
(45) Date of Patent: Apr. 7, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shogo Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 18/421,035

(22) Filed: Jan. 24, 2024

(65) Prior Publication Data

US 2024/0265689 A1 Aug. 8, 2024

(30) Foreign Application Priority Data

Feb. 6, 2023 (JP) ................................ 2023-016068

(51) Int. Cl.
| | |
|---|---|
| *G06V 10/82* | (2022.01) |
| *G06T 11/00* | (2006.01) |
| *G06V 10/56* | (2022.01) |
| *G06V 20/20* | (2022.01) |

(52) U.S. Cl.
CPC .............. *G06V 10/82* (2022.01); *G06T 11/00* (2013.01); *G06V 10/56* (2022.01); *G06V 20/20* (2022.01)

(58) Field of Classification Search
CPC ........ G06V 10/82; G06V 10/56; G06V 20/20; G06T 11/00; G06T 19/20; G06T 11/001; G06T 15/005; G06T 17/20; G06T 19/006; G06T 2219/2012
See application file for complete search history.

(56) References Cited

U.S. PATENT DOCUMENTS

| | | | |
|---|---|---|---|
| 10,140,777 B2 | 11/2018 | Nakagawa | |
| 11,200,706 B2 | 12/2021 | Takemoto | |
| 2012/0045094 A1* | 2/2012 | Kubota | H04N 23/611 |
| | | | 382/103 |
| 2016/0086024 A1* | 3/2016 | Tsukamoto | G06V 40/10 |
| | | | 382/103 |
| 2018/0040169 A1 | 2/2018 | Nakagawa | |
| 2019/0379835 A1* | 12/2019 | Tsubusaki | G01S 3/00 |
| 2020/0117336 A1* | 4/2020 | Mani | F25B 49/005 |
| 2021/0201661 A1* | 7/2021 | Al Jazaery | G06V 10/764 |
| 2022/0230358 A1 | 7/2022 | Takemoto | |

FOREIGN PATENT DOCUMENTS

JP 2018-022292 A 2/2018

OTHER PUBLICATIONS

Hengshuang Zhao, et al., "ICNet for Real-Time Semantic Segmentation on High-Resolution Images," Proceedings of the European Conference on Computer Vision (ECCV), 2018, pp. 1-16.

* cited by examiner

*Primary Examiner* — Jitesh Patel
(74) *Attorney, Agent, or Firm* — Venable LLP

(57) ABSTRACT

An information processing apparatus includes at least one memory and at least one processor which function as: a first detection unit configured to repeatedly perform first processing for detecting a specific object from a real space by using setting information stored in a memory; a second detection unit configured to perform second processing for detecting the specific object from the real space, the second processing needing time longer than time needed for the first processing; an update unit configured to update the setting information, based on a result of the second processing; and a control unit configured to control to perform predetermined processing, based on a result of the first processing.

11 Claims, 5 Drawing Sheets

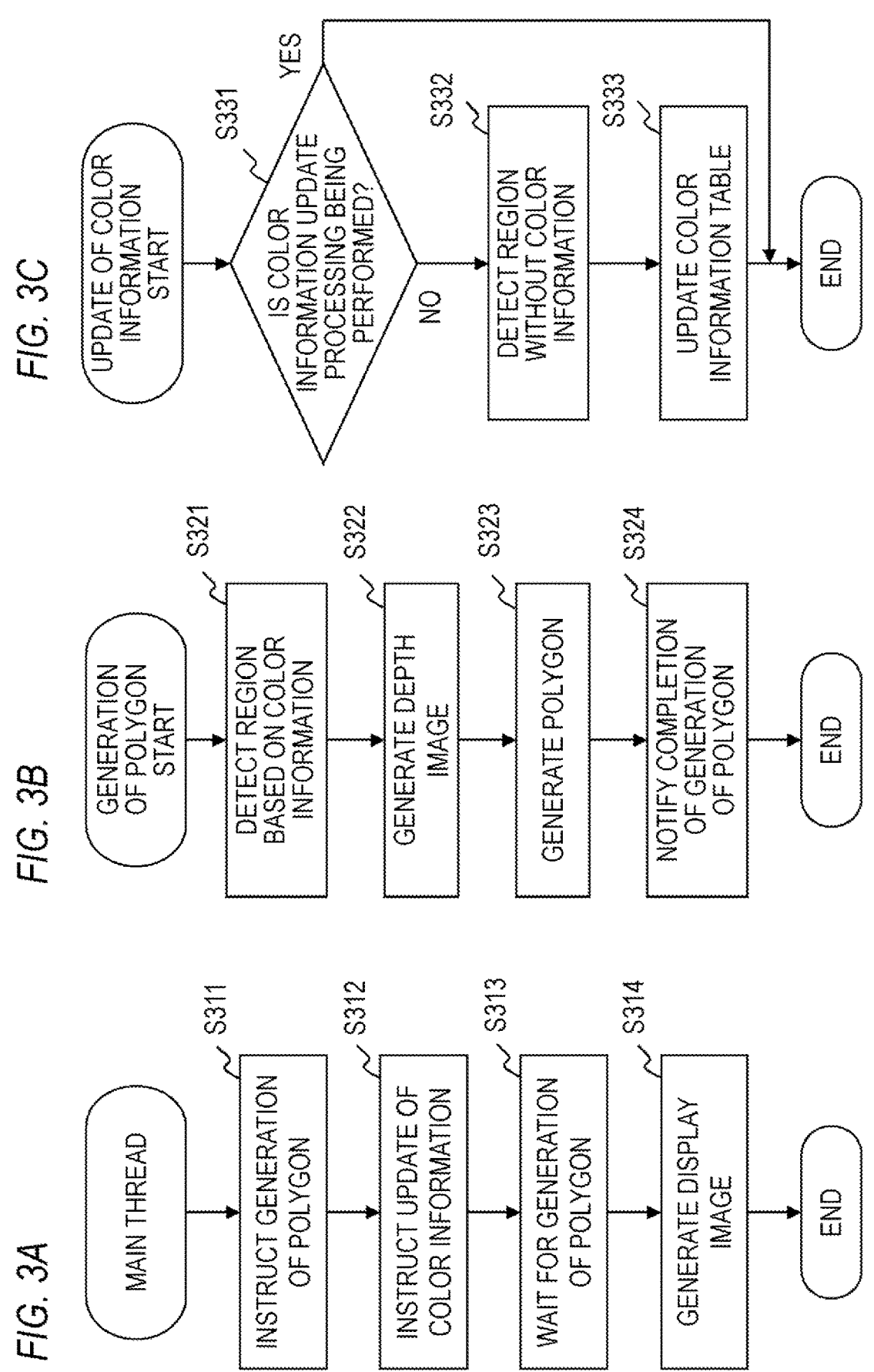

FIG. 3A

MAIN THREAD

S311 — INSTRUCT GENERATION OF POLYGON

S312 — INSTRUCT UPDATE OF COLOR INFORMATION

S313 — WAIT FOR GENERATION OF POLYGON

S314 — GENERATE DISPLAY IMAGE

END

FIG. 3B

GENERATION OF POLYGON START

S321 — DETECT REGION BASED ON COLOR INFORMATION

S322 — GENERATE DEPTH IMAGE

S323 — GENERATE POLYGON

S324 — NOTIFY COMPLETION OF GENERATION OF POLYGON

END

FIG. 3C

UPDATE OF COLOR INFORMATION START

S331 — IS COLOR INFORMATION UPDATE PROCESSING BEING PERFORMED?

YES

NO

S332 — DETECT REGION WITHOUT COLOR INFORMATION

S333 — UPDATE COLOR INFORMATION TABLE

END

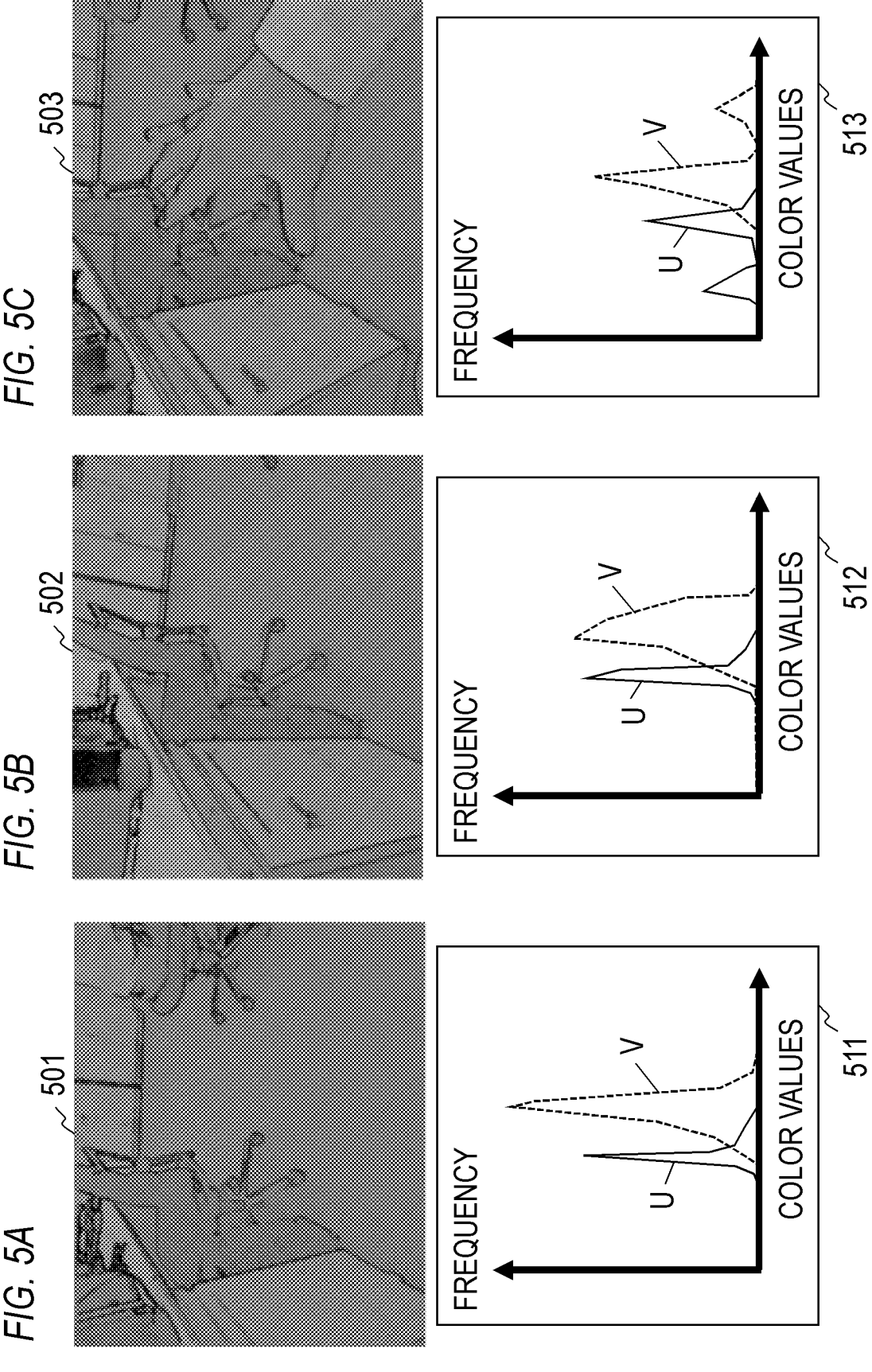

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus, an information processing method, and a storage medium.

Description of the Related Art

In recent years, research has been conducted on mixed reality (MR) in which information on a virtual space is superimposed on a real space in real time to be presented to users. Mixed reality is a technique for displaying a composite image obtained by superimposing an image of a virtual space corresponding to the position and orientation of an imaging device, such as a head mounted display (HMD), on all or a part of the region of real-life video captured by the imaging device.

MR systems using the mixed reality technique can express the sense of distance between objects by not displaying, in a region where a real object and a virtual object overlap each other in a composite image, the region of the object placed on the deeper side.

For example, when the user wearing the HMD holds a real object such as his or her hand or a tool in front of a virtual object, the MR system can display the hand or the tool as if the hand or the tool were in front of the virtual object by not depicting the virtual object in the region of the hand or the tool on the captured image. In this way, the positional relationship between the virtual object and the real object can be easily ascertained, and the user can easily check the operation using the real hand or tool in the virtual space.

MR systems can express the positional relationship between a real object and a virtual object by detecting the real object and measuring the distance from the user to the real object. Japanese Patent Application Publication No. 2018-022292 discloses a technique in which a polygon of fingers is generated from the contour of a skin color region extracted from a captured image, a collision between a real object and a virtual object is determined, and rendering is performed such that the fingers do not sink into the virtual object.

In Zhao, Hengshuang, et al. "ICnet for Real-Time Semantic Segmentation on High-Resolution Images" Proceedings of the European conference on computer vision (ECCV). 2018, a technique is disclosed in which a region of a hand is extracted by a trained model that has learned various hand images by using a deep neural network.

However, the color of fingers varies from user to user and changes depending on optical conditions such as ambient illumination. Therefore, even when the region of the skin color is extracted, the region of the fingers may not be correctly extracted. In addition, since MR systems generate a composite image to be displayed for each frame, the processing for extracting the region of an object for each frame by using a trained model trained by a neural network takes a long time. This makes it difficult to perform real-time processing.

SUMMARY OF THE INVENTION

The present invention provides an information processing apparatus capable of quickly and stably detecting the region of an object in a captured image even when the color of the object changes in accordance with optical conditions.

An information processing apparatus according to the present invention includes at least one memory and at least one processor which function as: a first detection unit configured to repeatedly perform first processing for detecting a specific object from a real space by using setting information stored in a memory; a second detection unit configured to perform second processing for detecting the specific object from the real space, the second processing needing time longer than time needed for the first processing; an update unit configured to update the setting information, based on a result of the second processing; and a control unit configured to control to perform predetermined processing, based on a result of the first processing.

Further features of the present invention will become apparent from the following description of exemplary embodiments with reference to the attached drawings.

BRIEF DESCRIPTION OF THE DRAWINGS

FIGS. 3A to 3C are flowcharts illustrating an example of display image generation processing according to Embodiment 1;

FIGS. 5A to 5C illustrate examples of color histograms used in Embodiment 2.

DESCRIPTION OF THE EMBODIMENTS

Embodiment 1

Figure 1:
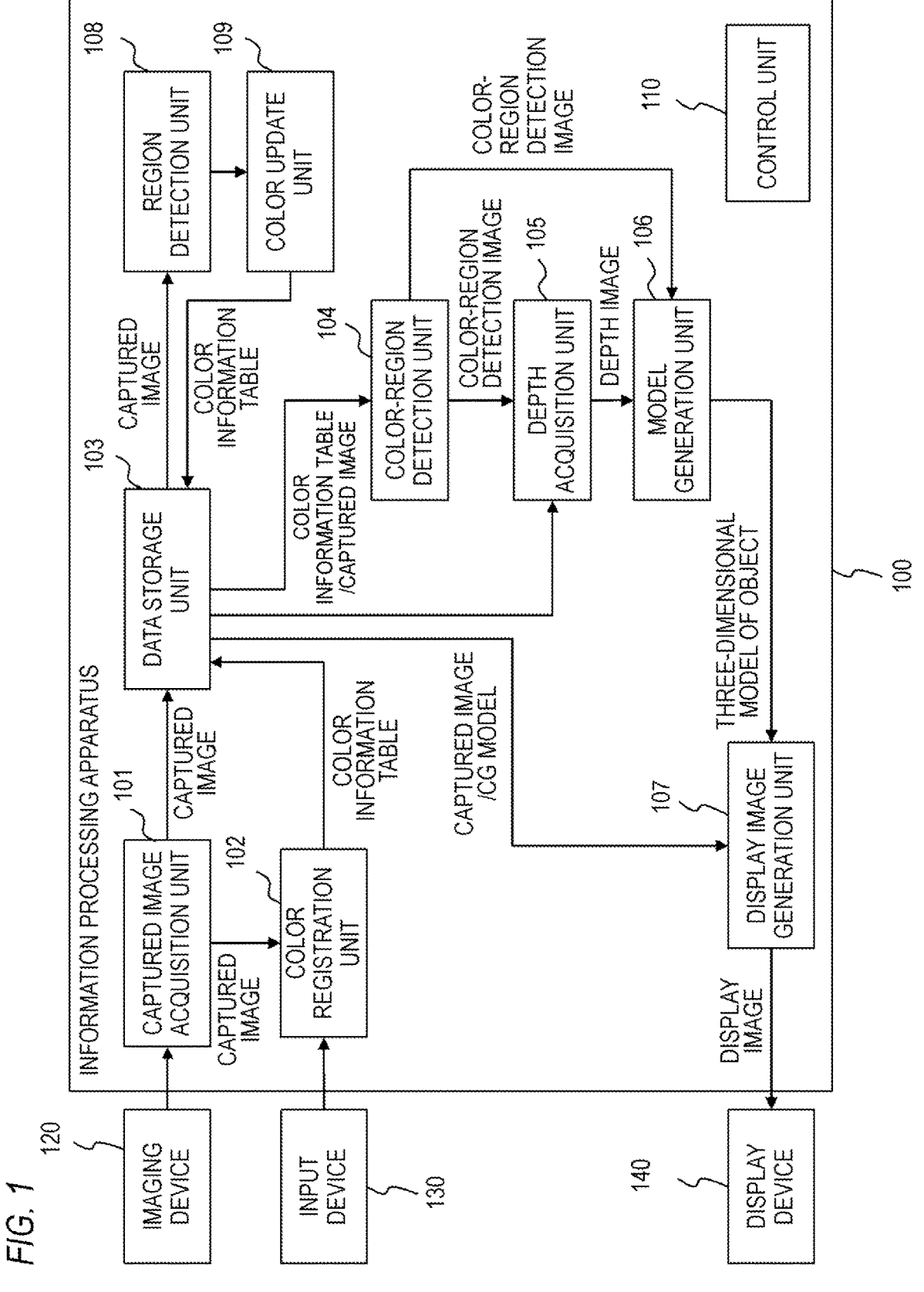
FIG. 1 is a block diagram illustrating an example of a functional configuration of an information processing system.

Hereinafter, Embodiment 1 for implementing the present invention will be described with reference to the drawings. FIG. 1 is a block diagram illustrating an example of a functional configuration of an information processing system according to Embodiment 1. The information processing system includes an imaging device 120, an input device 130, a display device 140, and an information processing apparatus 100. The information processing apparatus 100 is connected to the imaging device 120, the input device 130, and the display device 140. The configuration of the information processing apparatus 100 is not limited to the example in FIG. 1 and may be configured integrally with at least one of the imaging device 120, the input device 130, and the display device 140.

The information processing apparatus 100 includes a captured image acquisition unit 101, a color registration unit 102, a data storage unit 103 (memory), a color-region detection unit 104, a depth acquisition unit 105, a model generation unit 106, a display image generation unit 107, a region detection unit 108, and a color update unit 109. In addition, the information processing apparatus 100 includes a control unit 110 that controls processing performed by each processing unit of the information processing apparatus 100.

The captured image acquisition unit 101 stores a captured image of a real space captured by the imaging device 120 in the data storage unit 103. The imaging device 120 is, for example, a stereo camera including a plurality of cameras and can capture a stereo image.

The color registration unit 102 generates a color information table based on the captured image acquired from the captured image acquisition unit 101 and user input information acquired from the input device 130. The color registration unit 102 registers, as a detection color, the color of a detection target object, which is specified on the captured image by the user, in the color information table. For example, the user can specify the color of the object to be registered by surrounding a part of the region of the detection target object with an ellipse or a rectangle on the captured image by using the input device 130 such as a mouse. The color registration unit 102 registers, as detection colors, a plurality of colors such as a color included in the specified region and a color near the color included in the specified region in the color space. The color registration method is not limited to the above method, and the color registration unit 102 may register the detection color in the color information table by a known technique.

The color information to be registered in the color information table is expressed by a color space such as RGB, YUV, HSV, or Lab. The color information is not limited to chromatic color information and may be achromatic color information (information on brightness). The color information may be information extracted from an infrared image by an infrared sensor.

When there are a plurality of detection target objects, the color registration unit 102 registers, as a detection color, the color of each object in the color information table based on a user specification. In this case, the color registration unit 102 may register the detection color associated with the detection target object or may register the detection color without associating the detection color with the detection target object. When the detection colors associated with the respective objects are registered, the color-region detection unit 104 can separately detect a plurality of objects.

The color registration unit 102 may register, as a non-detection color, a color not to be detected as the color of the object in the color information table based on a user specification. The non-detection color is used, for example, to prevent a background having a color similar to that of the detection target from being detected in a case where the background image includes a color similar to that of the detection target such as a hand of the user. The color registration unit 102 registers, as a non-detection color, a color specified by the user as a color similar to that of the detection target on the captured background image, in the color information table.

When the user specifies the detection color and this specified color detects a region other than the region of the target object, the color registration unit 102 may register the color of the region other than the region of the target object as a non-detection color. By excluding the region of the non-detection color from the detection target, the detection of the region other than the region of the target object, which is unintended by the user, is reduced, and the color-region detection unit 104 can accurately detect the object. The color registration unit 102 stores the generated color information table in the data storage unit 103.

The color-region detection unit 104 (first detection unit) detects a specific object (real object) to be modeled from the captured image of the real space stored in the data storage unit 103 by using the color information registered in the color information table. The color-region detection unit 104 generates a color-region detection image representing the region of the detected object. The color-region detection unit

104 repeatedly performs the processing for detecting the specific object from the captured image (frame) that the captured image acquisition unit 101 has acquired and stored in the data storage unit 103. The color information, such as the detection color and the non-detection color, registered in the color information table is an example of setting information. The processing in which the color-region detection unit 104 detects the specific object from the real space by using the color information is an example of first processing.

The depth acquisition unit 105 acquires depth information and generates a depth image based on the captured image. The depth acquisition unit 105 can obtain the depth of the entire image from the stereo image by a method such as a semi-global matching (SGM). The depth acquisition unit 105 may also limit the region whose depth is to be obtained so as to improve the accuracy by masking the region other than the region of the detection target object in the captured image by using the color-region detection image generated by the color-region detection unit 104.

The model generation unit 106 detects the detection target object (real object such as a hand) by using the color-region detection image generated by the color-region detection unit 104 and the depth image generated by the depth acquisition unit 105 and generates a three-dimensional model. The model generation unit 106 generates, for example, a two-dimensional polygon from the color-region detection image and generates a three-dimensional polygon (three-dimensional model) of the detected object by using the depth information on the depth image. The model generation unit 106 may generate the two-dimensional polygon from the color-region detection image by using the Marching Squares method or the like or may generate the two-dimensional polygon from the contour of the object extracted from the color-region detection image by using the Delaunay triangulation method. In addition, when the shape of the detection target object is limited to the shape that is known in advance, such as a hand, the model generation unit 106 may generate the three-dimensional model by using model fitting or the like.

The display image generation unit 107 generates a display image to be displayed on the display device 140 by combining a computer graphics (CG) model (virtual object) and the captured image stored in the data storage unit 103. The display image generation unit 107 first renders the captured image as a background, then enables depth testing, renders a transparent thickness model (the three-dimensional model of the object generated by the model generation unit 106), and finally renders the CG model. By performing this processing, the display image generation unit 107 can generate the display image in which the three-dimensional model of the real object and the CG model are superimposed on the captured image while appropriately expressing the sense of distance between these models.

The region detection unit 108 (second detection unit) more accurately detects a detection target object, such as a hand and a face, from the captured image stored in the data storage unit 103. For example, a deep neural network may be used to generate in advance a trained model that has been trained to be capable of detecting the detection target object, and the region detection unit 108 may detect the detection target object by using the generated trained model. The region detection unit 108 may obtain a rectangular region including the detection target object by using a cascade classifier or the like and perform contour fitting by the Snakes method. The region detection unit 108 may detect the detection target object by using a method, such as Active Shape Model and Active Appearance Model, in which a non-rigid object is modeled, and the fitting is performed by using contour information and texture information.

Although the processing for detecting the object by using the region detection unit 108 needs a longer time than the processing for detecting the object having the detection color registered in the color information table by using the color-region detection unit 104, the processing for detecting the object by using the region detection unit 108 can accurately detect the detection target object without the color information (setting information) registered in advance. The region detection unit 108 generates an object-region detection image representing the region of the detected object.

The color update unit 109 updates the color information table based on the color information extracted from the region of the object included in the object-region detection image generated by the region detection unit 108. The color update unit 109 does not register, as a detection color, the color that is registered as a non-detection color in the color information table by the user even if the color is extracted from the region of the object included in the object-region detection image. The color update unit 109 records the updated color information table in the data storage unit 103.

Figure 2:
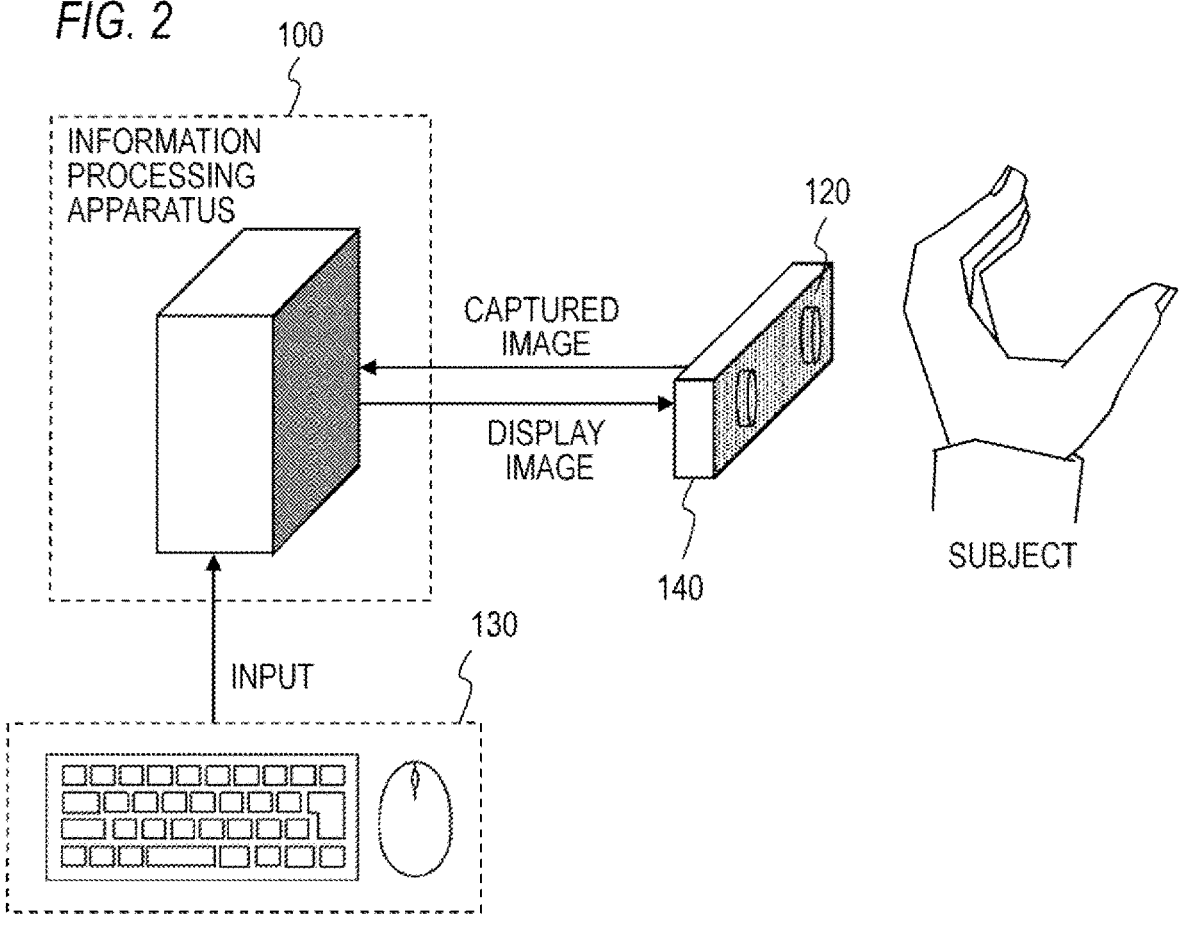
FIG. 2 is a schematic view illustrating an example of a device configuration of the information processing system.

FIG. 2 is a schematic view illustrating an example of a device configuration of the information processing system according to Embodiment 1. In the example in FIG. 2, the information processing apparatus 100 is connected to the imaging device 120, the display device 140, and the input device 130.

The imaging device 120 is, for example, a camera incorporated in the HMD and captures an image of a subject to be modeled (detection target object). The HMD may be a video see-through type or optical see-through type HMD. The display device 140 includes a display such as a display of the HMD and a monitor of a personal computer (PC). The input device 130 includes, for example, a mouse and a keyboard connected to the PC.

FIGS. 3A to 3C are flowcharts illustrating an example of display image generation processing according to Embodiment 1. The flowcharts in FIGS. 3A to 3C are asynchronously executed on the respective threads. The information processing apparatus 100 generates a display image by using a polygon of the object detected by using the color information and performs processing for updating the detection color registered in the color information table asynchronously with the generation of the display image.

The information processing apparatus 100 detects the object with higher accuracy than extracting the region by using the color information and dynamically updates the color information table by using the color extracted from the detected object. In this way, the information processing apparatus 100 can stably extract the region of the object even when the color of the detection target object changes due to a change in optical conditions. The information processing apparatus 100 generates a display image at a higher speed by detecting the object by using the color information in the color information table, and in parallel with the display image generation processing, the information processing apparatus 100 accurately detects the object and updates color information. As a result, the information processing apparatus 100 can realize faster and stable image displaying. By detecting the object and generating the display image at a higher speed (for example, at a frame rate of 60 fps or higher), the information processing apparatus 100 can reduce the sense of discomfort and motion sickness that the user might feel.

FIG. 3A illustrates a flowchart of the display image generation processing performed on the main thread by the control unit 110 when the captured image acquisition unit 101 acquires a captured image. The display image generation processing is repeatedly performed for each captured image (frame) acquired by the captured image acquisition unit 101.

In step S311, the control unit 110 instructs the generation of a polygon (a three-dimensional model of the detection target object) on the polygon generation thread. The control unit 110 performs polygon generation processing illustrated in FIG. 3B as processing performed asynchronously with the processing illustrated in FIG. 3A. After instructing the generation of the polygon, the control unit 110 advances the processing to step S312.

In step S312, the control unit 110 instructs the update of the color information on the color information update thread. The control unit 110 performs color information update processing illustrated in FIG. 3C as processing performed asynchronously with the processing illustrated in FIG. 3A. After instructing the update of the color information, the control unit 110 advances the processing to step S313.

In step S313, the control unit 110 waits for the processing for generating the polygon illustrated in FIG. 3B to be completed. When receiving a notification that the generation of the polygon is completed, the control unit 110 advances the processing to step S314. In step S314, the display image generation unit 107 generates a display image by using the polygon (three-dimensional model of the detection target object) generated by the processing illustrated in FIG. 3B.

FIG. 3B illustrates a flowchart of the polygon generation processing performed on the polygon generation thread when the generation of a polygon is instructed in step S311. In step S321, the color-region detection unit 104 detects the region of the detection color registered in the color information table (first processing) and generates a color-region detection image. In step S322, the depth acquisition unit 105 acquires depth information and generates a depth image.

In step S323, the model generation unit 106 generates a three-dimensional model of the detection target object from the color-region detection image generated in step S321 and the depth image generated in step S322. In step S324, the model generation unit 106 notifies the control unit 110 performing the processing on the main thread that the generation of the polygon is completed.

FIG. 3C illustrates a flowchart of the color information update processing performed on the color information update thread when the update of the color information is instructed in step S312. In step S331, the region detection unit 108 determines whether the color information update processing illustrated in FIG. 3C is being performed. If the color information update processing is being performed, the processing illustrated in FIG. 3C ends. If the color information update processing is not being performed, the control unit 110 advances the processing to step S332.

In step S332, the region detection unit 108 detects the region of the detection target object by using a trained model that has been trained to be able to detect a specific object by using a deep neural network or the like, without using the color information table. The processing for detecting the region of the object in step S332 is performed asynchronously with the generation of the display image so as to detect the region of the object with high accuracy by using more time than the detection processing in step S321.

In step S333, the color update unit 109 extracts the color included in the region of the object detected in step S332 and updates the detection color registered in the color information table.

In Embodiment 1 described above, the information processing apparatus 100 repeatedly performs the processing (first processing) for detecting the object having the detection color registered in the color information table from a captured image of a real space. In addition, the information processing apparatus 100 performs the processing (second processing) for detecting the detection target object from a captured image of a real space asynchronously with the first processing by using a trained model that has been trained by using a deep neural network or the like. The information processing apparatus 100 extracts the color of the region of the object detected by the second processing and updates the information on the detection color registered in the color information table. Since the color information (setting information) in the color information table is dynamically updated by the second processing, the information processing apparatus 100 can stably detect the object by the first processing. That is, even when the color of the detection target object changes from the detection color registered in advance due to a change in optical conditions, the information processing apparatus 100 can quickly and stably extract the region of the object since the detection color is appropriately updated by the second processing. Therefore, the information processing apparatus 100 can quickly and stably perform the processing (an example of predetermined processing) for generating a display image by combining the model of the object detected based on the result of the first processing and the CG model with the captured image of the real space.

Embodiment 2

In Embodiment 1, the object detection processing (second processing) by the region detection unit 108 is performed regardless of whether or not the detection target object is present in the captured image. In Embodiment 2, the information processing apparatus 100 reduces calculation resources and power consumption by not performing object detection processing by the region detection unit 108 on a frame in which no detection target object is present in the captured image. Display image generation processing and polygon generation processing according to Embodiment 2 are the same as the processing in FIG. 3A and the processing in FIG. 3B, respectively, described in Embodiment 1.

Figure 4:
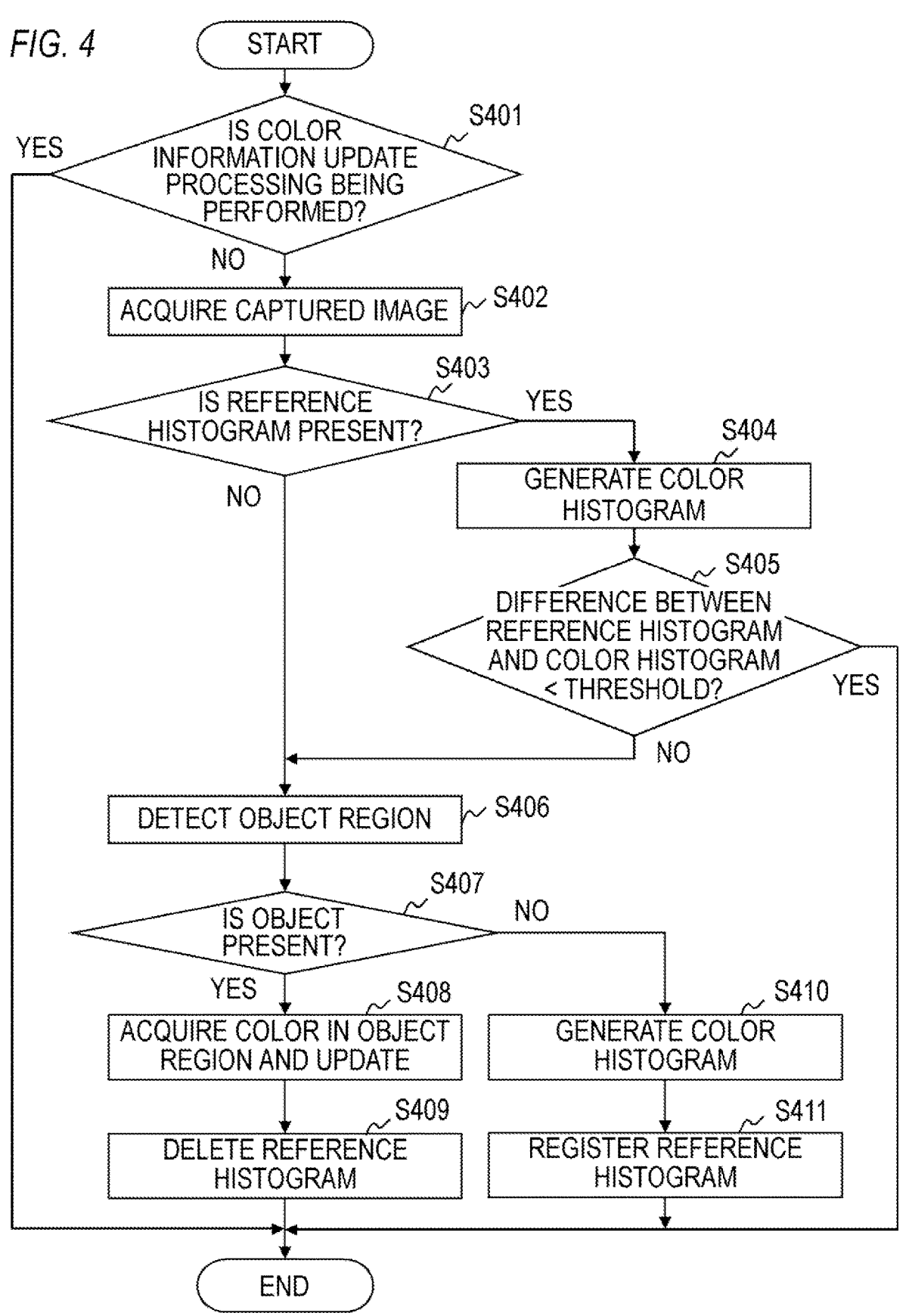
FIG. 4 is a flowchart illustrating an example of color information update processing according to Embodiment 2.

FIG. 4 is a flowchart illustrating an example of color information update processing according to Embodiment 2. The processing illustrated in FIG. 4 is performed by the region detection unit 108 and the color update unit 109 of the information processing apparatus 100. In Embodiment 2, when the control unit 110 instructs the update of the color information in step S312 in FIG. 3A, the region detection unit 108 and the color update unit 109 perform the color information update processing illustrated in FIG. 4 instead of the processing illustrated in FIG. 3C.

In step S401, the region detection unit 108 determines whether the color information update processing illustrated in FIG. 4 is being performed. If the color information update processing is being performed, the processing illustrated in FIG. 4 ends. If the color information update processing is not being performed, the control unit 110 advances the processing to the step S402.

In step S402, the region detection unit 108 acquires a captured image from the data storage unit 103. In step S403, the region detection unit 108 determines whether a reference histogram is present in the data storage unit 103. The reference histogram is a color histogram of a captured image in which no detection target object is present. The reference histogram is registered in the data storage unit 103 when the detection target object is not detected in the previous frame. If the reference histogram is present, the processing proceeds to step S404. If the reference histogram is not present, the processing proceeds to step S406.

The reference histogram is a color histogram of the entire captured image. The color histogram is obtained by counting the frequency of appearance of a color in the captured image and may be obtained for each color in a predetermined color space or each channel. The reference histogram is used to determine how much the current frame has changed from the previous frame. The reference histogram is an example of a reference color distribution, and the color histogram is an example of a color distribution.

In step S404, the region detection unit 108 generates a color histogram from the captured image. In step S405, the region detection unit 108 determines whether a difference between the generated color histogram and the reference histogram is smaller than a predetermined threshold. The difference between the two color histograms may be, for example, the sum of the differences in frequency for respective colors of the color histograms or the mode value of the differences in frequency for respective colors of the color histograms. Note that, when the difference between the two color histograms is equal to or larger than a predetermined threshold, the processing proceeds to step S406. If the difference between the two color histograms is smaller than the predetermined threshold, the processing illustrated in FIG. 4 ends.

In step S406, the region detection unit 108 detects the region of the detection target object by using a trained model that has been trained by a deep neural network or the like, without using the color information table (second processing). In step S407, the region detection unit 108 determines whether the detection target object is present in the captured image. If the detection target object is present in the captured image, the processing proceeds to step S408. If the detection target object is not present in the captured image, the processing proceeds to step S410.

In step S408, the color update unit 109 extracts a color included in the region of the object detected in step S406 and updates the color information table by registering the extracted color as the detection color of the object. If the extracted color is a non-detection color, the color update unit 109 does not register the extracted color in the color information table as a detection color. In step S409, the color update unit 109 deletes the reference histogram from the data storage unit 103, and the processing ends.

In step S410, the region detection unit 108 generates a color histogram of the captured image. In step S411, the region detection unit 108 registers the generated color histogram in the data storage unit 103 as a reference histogram.

FIGS. 5A to 5C illustrate examples of the color histograms of a scene assumed in a case where the detection target object to be modeled is a hand of the user. The examples of the color histograms in FIGS. 5A to 5C are illustrated by overlapping the histograms of color values of U and V in the YUV color space.

FIG. 5A and FIG. 5B illustrate a scene 501 and a scene 502, respectively, in each of which no hand appears, and their respective color histograms. FIG. 5C illustrates a scene 503, which is approximately the same scene as the scene 501 and the scene 502 and in which a hand appears, and its color histogram.

These scenes are assumed to be captured in the order of the scene 501, the scene 502, and the scene 503. Since the hand does not appear in the scene 501, the region detection unit 108 determines that the detection target object is not present in step S407 and registers a color histogram 511 generated in step S410 in the data storage unit 103 as a reference histogram.

While the scene 502 is captured in a state where the position and orientation of the imaging device 120 are different from those of the scene 501, the hand does not appear in the scene 502, as in the scene 501. Since the color histogram 511 of the scene 501 is registered in the data storage unit 103 as the reference histogram, the region detection unit 108 generates a color histogram 512 of the scene 502 in step S404. The region detection unit 108 compares the color histogram 512 with the reference histogram (color histogram 511) in step S405. The difference between the color histogram 511 and the color histogram 512 is determined to be equal to or smaller than the threshold, and the color information update processing in FIG. 4 ends.

While the scene 503 is captured in a state where the position and orientation of the imaging device 120 are approximately the same as those of the scene 502, unlike the scenes 501 and 502, the hand, which is the detection target, appears in the scene 503. Since the color histogram 511 of the scene 501 is registered in the data storage unit 103 as the reference histogram without being deleted, the region detection unit 108 generates a color histogram 513 of the scene 503 in step S404. The region detection unit 108 compares the color histogram 513 with the reference histogram (color histogram 511) in step S405. The color histogram 511 and the color histogram 513 have different frequencies of the mode values, and the color histogram 513 indicates peaks that the color histogram 511 and the color histogram 512 do not have. It is determined that the difference between the color histogram 511 and the color histogram 513 is larger than the threshold, and the region detection unit 108 performs the region detection processing on the hand (object) in step S406.

In Embodiment 2 described above, the information processing apparatus 100 determines whether a detection target object is present in a captured image based on the difference between the color histogram of the captured image in which no detection target object is present (reference histogram) and the color histogram of the captured image (frame) currently being processed. When the detection target object is not present in the captured image, the information processing apparatus 100 can reduce calculation resources and power consumption by not performing the object detection by the region detection unit 108.

Although the present invention has been described in detail based on the preferred embodiments, the present invention is not limited to these specific embodiments and includes various forms without departing from the gist of the present invention. The above-described embodiments are merely examples of the present invention, and various forms can be combined as appropriate.

According to the present invention, even when the color of an object changes in accordance with optical conditions, the region of the object in a captured image can be quickly and stably detected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-016068, filed on Feb. 6, 2023, which is hereby incorporated by reference herein in its entirety.

What is claimed is:

1. An information processing apparatus comprising:

a processor; and a memory storing a program which, when executed by the processor, causes the information processing apparatus to:

(1) execute first detection processing of repeatedly performing first processing for detecting a specific object from a real space by using setting information stored in a memory;

(2) execute second detection processing of performing, in parallel asynchronously with the first processing, second processing for detecting the specific object from the real space with higher accuracy than the first processing, the second processing needing time longer than time needed for the first processing;

(3) execute update processing of updating the setting information dynamically, based on a result of the second processing; and (4) execute control processing of performing predetermined processing, based on a result of the first processing that has been performed by using latest updated setting information.

2. The information processing apparatus according to claim 1, wherein the predetermined processing is processing for generating a display image by combining a virtual object with a captured image of the real space.

3. The information processing apparatus according to claim 1, wherein the setting information includes color information on the specific object, wherein in the first detection processing, the specific object is detected by using the color information on the specific object, and wherein in the update processing, the setting information is updated by using the color information on the specific object detected in the second processing.

4. The information processing apparatus according to claim 1, wherein the setting information includes information on (1) a detection color to be detected as a color of the specific object and (2) a non-detection color not to be detected as a color of the specific object, and wherein in the update processing, in a case where a color extracted from the specific object detected by the second processing is the non-detection color, an extracted color is not registered as the detection color of the setting information.

5. The information processing apparatus according to claim 3, wherein in the second detection processing, the specific object is detected, without using the color information of the specific object, by using a trained model that has been trained so as to be capable of detecting the specific object by using a deep neural network.

6. The information processing apparatus according to claim 3, wherein in the second detection processing, the specific object is detected, without using the color information on the specific object, by using depth information acquired from a captured image of the specific object.

7. The information processing apparatus according to claim 3, wherein in a case where a difference between (1) a reference color distribution, which is a color distribution of a first captured image in which the specific object has not been detected, and (2) a color distribution of a second captured image captured after the first captured image is smaller than a predetermined threshold, the second processing on the second captured image is not performed in the second detection processing.

8. The information processing apparatus according to claim 1, wherein in the second detection processing, in a case where a color of the specific object changes due to a change in optical conditions, a region of the specific object is detected by using a trained model that has been trained so as to be capable of detecting the specific object, and wherein in the update processing, the setting information is updated based on color information extracted from the region of the specific object.

9. The information processing apparatus according to claim 7, wherein in the first detection processing, (1) the first processing is performed on the first captured image and (2) the first processing is also performed on the second captured image.

10. An information processing method comprising:

performing first processing for detecting a specific object from a real space by using setting information stored in a memory;

performing, in parallel asynchronously with the first processing, second processing for detecting the specific object from the real space with higher accuracy than the first processing, the second processing needing time longer than time needed for the first processing;

updating the setting information dynamically, based on a result of the second processing; and controlling to perform predetermined processing, based on a result of the first processing that has been performed by using latest updated setting information.

11. A non-transitory computer-readable storage medium that stores a program for causing a computer to execute an information processing method comprising:

performing first processing for detecting a specific object from a real space by using setting information stored in a memory;

performing, in parallel asynchronously with the first processing, second processing for detecting the specific object from the real space with higher accuracy than the first processing, the second processing needing time longer than time needed for the first processing;

updating the setting information dynamically, based on a result of the second processing; and controlling to perform predetermined processing, based on a result of the first processing that has been performed by using latest updated setting information.

* * * * *